June 3, 1952 V. O. GITTUS 2,598,783
METHOD AND APPARATUS FOR MEASURING AND
VARYING THE COLOR QUALITY OF LIGHT
Filed Nov. 2, 1948 2 SHEETS—SHEET 1
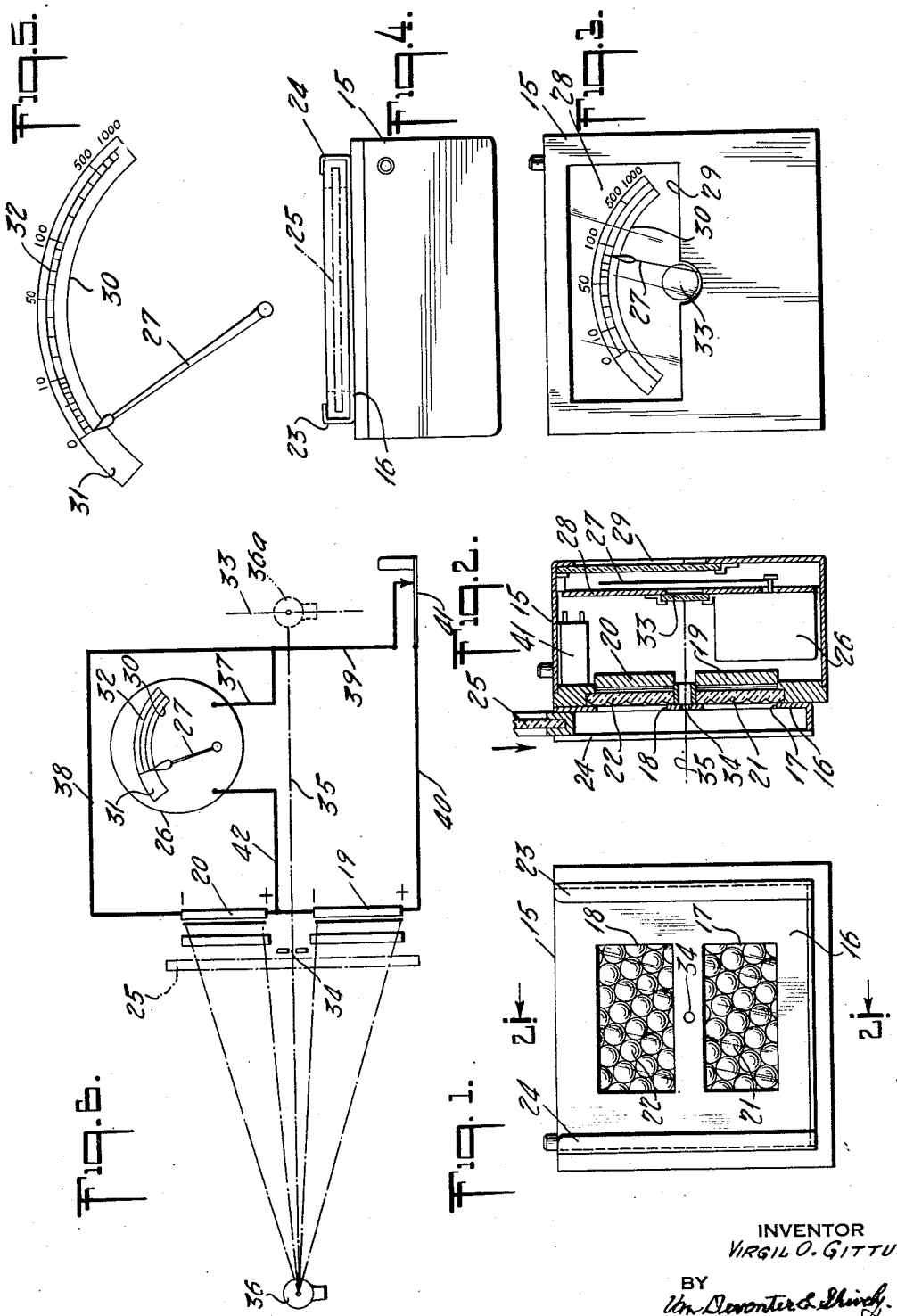
INVENTOR
VIRGIL O. GITTUS
ATTORNEYS

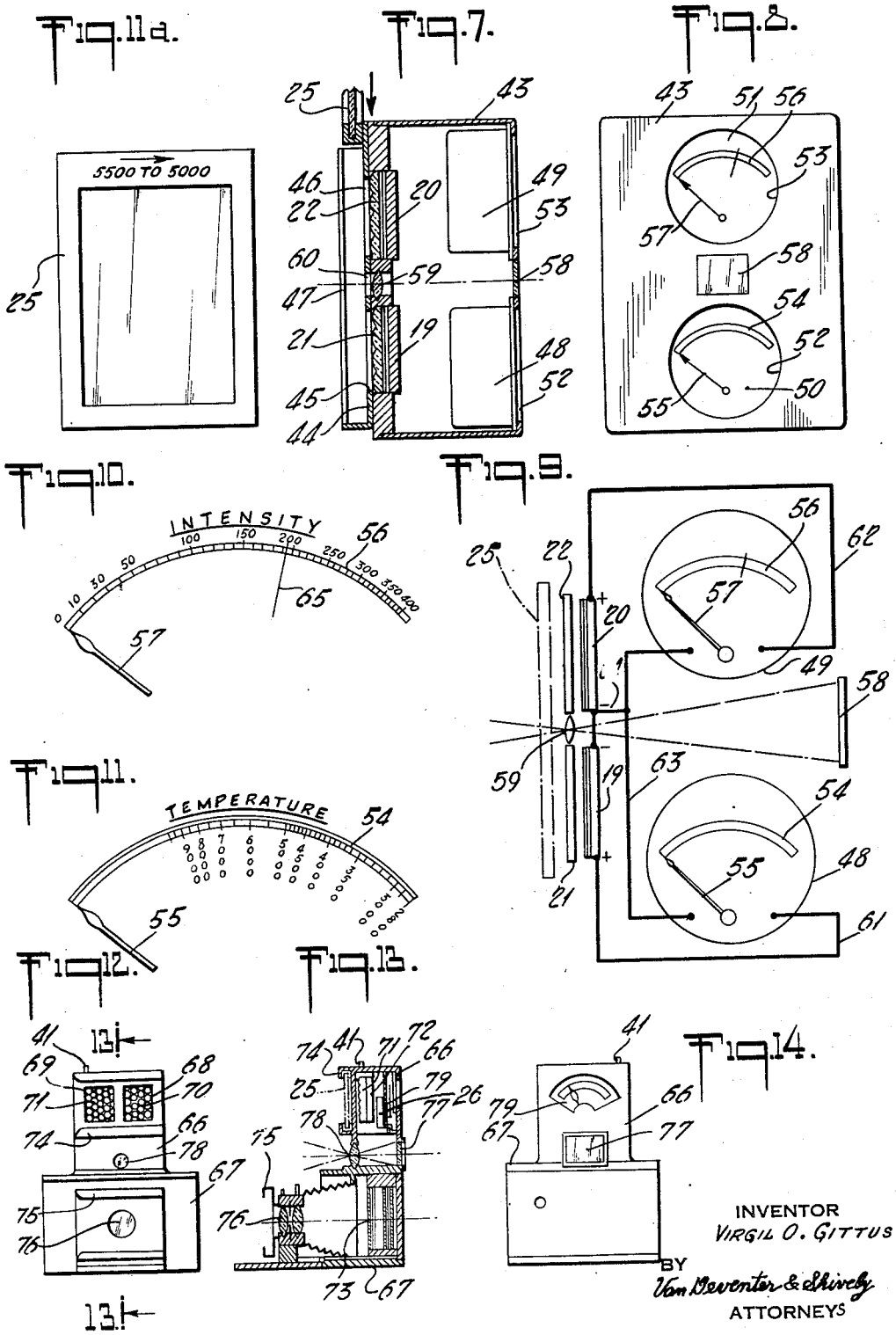

Patented June 3, 1952

2,598,783

UNITED STATES PATENT OFFICE 2,598,783

METHOD AND APPARATUS FOR MEASURING AND VARYING THE COLOR QUALITY OF LIGHT

Virgil O. Gittus, Brooklyn, N. Y.; Lillie Rocker Gittus, administratrix of said Virgil O. Gittus, deceased, assignor to herself Application November 2, 1948, Serial No. 57,892

8 Claims. (Cl. 88—23)

The present invention pertains to improvements in methods and apparatus for measuring and varying the color quality and intensity of light, this application being a continuation-in-part of my co-pending application, Serial No. 606,781, filed July 24, 1945, now U. S. Patent 2,455,116, issued November 30, 1948.

In the above-mentioned application are described and claimed methods and apparatus for measuring the color quality or temperature of light by the inter-relation of photo-electric responses to the two components thereof, being directed principally to the red and blue components.

An object of the present invention is to provide a method of determining the color characteristics of light by the inter-relation of the photo-electric response to the light containing all its colors and the response to a component thereof, such as the red component.

A further object is to provide a method combining the determination of the color characteristics of light by the above method with the conversion of the said characteristics to conform with a pre-determined standard.

A further object is the combination of a method of the above nature with direct measurement of the intensity of the converted light.

Another object is to provide a method of color-photography including the above methods.

A further object is to provide suitable apparatus for carrying out the above methods including two cooperative parallel light-receiving systems, one incorporating color-neutral filtering means to reduce the intensity of its initially received light without elimination of any component thereof, and the other incorporating a filter adapted to pass one component of its initially received light.

A further object is to provide apparatus of the above type in which the use of reversing switches is eliminated.

A still further object is to provide apparatus of the above type including sighting means to assure equal initial reception of light by both systems.

Another object is to provide apparatus of the above type which is simple, compact, and easily operable by inexperienced persons.

Other objects and advantages of the invention will appear during the course of the following description in connection with the accompanying drawings, in which:

Figure 1 is a front view of one embodiment showing the light-receiving windows;

Figure 2 is a vertical sectional view of the same in the plane 2—2, Figure 1;

Figure 3 is a rear elevation of the same showing the indicating meter;

Figure 4 is a top view of the same;

Figure 5 is an enlarged detail view of the meter dial;

Figure 6 is a diagram illustrating the operative relationship of the parts and the electrical connections;

Figure 7 is a vertical sectional view of an alternative form of the device embodying two meters;

Figure 8 is a rear elevation of the same showing the meter dials and the finder screen;

Figure 9 is a wiring and operational diagram of the same;

Figure 10 is an enlarged detail view of the intensity meter scale;

Figure 11 is a similar view of the temperature meter scale;

Figure 11a shows a calibrated type of compensating filter;

Figure 12 is a front view of an embodiment including a camera;

Figure 13 is a vertical sectional view of the same in the plane 13—13, Figure 12; and Figure 14 is a rear elevation of the combined embodiment.

Referring to Figures 1 to 4, the numeral 15 designates a casing having a front panel 16 in which are two parallel openings or windows 17 and 18, of the same shape and area. A pair of photocells 19 and 20, of the photo-voltaic type which generate their own currents, are secured in the casing behind the windows 17 and 18 respectively. A red filter 21, preferably with a lenticular outer light-receiving surface as shown in Figures 1 and 2, is disposed between the cell 19 and the window 17. A similarly shaped filter 22 of neutral density adapted to pass all components of light but in proportionally reduced quantity, is secured between the second cell 20 and the window 18.

A pair of parallel angular slide-ways 23 and 24, disposed on the front of the casing panel 16, are adapted to receive inter-changeable compensating filters 25, Figures 4 and 6, each of these filters being of such size as to overlie both windows 17 and 18.

A suitable meter 26, preferably a micro-ammeter, has a hand 27 cooperative with a dial 28 visible through a window 29 in the rear of the casing 15, Figures 2 and 3. The dial 28 carries a scale 30 shown in enlarged detail in Figure 5. The zero point divides the scale 30 into a short red field 31 on the left, and a right hand field 32 calibrated toward the right in terms of light intensity as hereinafter set forth.

A small translucent finder screen 33, Figures 2 and 3, is set in the dial 28 in optical alignment with a pin-hole 34 in the front of the casing 10 midway between the windows 17 and 18. The optical axis 35 of the screen 33 and pinhole 34 is normal to the plane of the windows and equidistant from them. It is therefore evident that when the device is directed at a light source 36 as shown diagrammatically in Figure 6, and the image 36a of the source 36 is centered on the screen 33, the quantities of light received from the source by the windows 17 and 18 are equal.

One lead 37 of the meter 26, Figure 6, is connected via a wire 38 to the negative terminal of the cell 20 and also via wires 39 and 40 and a normally closed push-button switch 41 to the positive terminal of the cell 19. The second meter lead 42 is connected to the positive terminal of the cell 20 and also the negative terminal of the cell 19. By this arrangement it will be seen that when both cells are excited their currents buck each other through the meter 26, the latter's hand movement accordingly representing the difference of the two currents.

For purposes of simplicity the filter 21 overlying the cell 19 is referred to herein as "red." By this term is meant a "red" filter passing light from the red end of the spectrum to the center thereof slightly above the D-line in the yellow, as differentiated from the commonly designated "blue" filter which passes light from the D-line to the violet end of the spectrum.

The color quality of light is commonly described in terms of its "color temperature." In defining color temperature, a perfect source of radiation is taken as a standard, the usual source being a special type of lamp sometimes referred to as a "black body." If a given light has the same visual color as the perfect source, its color temperature is said to be the same as the actual temperature of the perfect source.

Color temperatures are defined in degrees Kelvin (°K.), the Kelvin scale being 273° higher than the centigrade scale. The "red" and "blue" components of light as defined above influence the temperature respectively in the downward and upward directions; i. e., the lower the percentage of the red component, the greater the temperature. For example, light containing 54% red has a color temperature of 3000° K., while light having 33% red has a temperature of 5400° K.

In various processes, such as color photography, it is highly important that the temperature of the light being used shall correspond closely to a light temperature standard inherent in the process. For example, a standard type of daylight film used in color-photography is graded to produce proper results when the objects being photographed are illuminated by light of temperature 6000° K. with a maximum tolerance of about 100° K. in either direction. However, in the use of such film it frequently occurs that the available light has a temperature differing more or less widely from 6000° K.

In such cases it is necessary first that the available light be converted to the proper temperature, and secondly, since the conversion entails the use of a compensating filter which may appreciably decrease the intensity, it is necessary to gage the intensity of the converted light in order to determine the proper exposure.

The form of the invention described above, properly balanced and calibrated as hereinafter set forth, makes possible a method of carrying out the noted operations with maximum simplicity.

The cells 19 and 20 are so chosen by prior test as to comprise a matched pair in the sense that their responses to equal amounts of light remain in the same proportion throughout their normal operating ranges. Thus it is not necessary that equal amounts of light on the two cells produce equal currents, so long as the linear increases or decreases in their currents due to equal changes in amounts of light remain in the same proportion. In the case of a matched pair of cells having unequal quantitative current responses to equal amounts of light, the cell having the greater response is normally chosen as cell 19 for reasons which will become apparent hereinafter.

As noted in connection with Figure 6, the cells 19 and 20 are connected to the meter 26 in bucking relation so that their current responses tend to nullify each other in determining the position of the hand 27. The connections to the meter are such that the current from the cell 19 urges the hand 27 to the left, while the current from cell 20 urges the hand to the right. Obviously, when the two currents are equal, the hand 27 stands at its normal zero point as shown in Figure 5.

The initial balancing and calibration of the instrument may be carried out as follows, using again for example the temperature of 6000° K. as the desired balancing point.

The red filter 21 is installed permanently in front of the cell 19, but the neutral density filter 22 is not placed in front of the cell 20 in the first operation. The instrument is then directed at a standard source giving light of 6000° K., the source being sighted on the finder screen 33 to assure that equal amounts of light reach the windows 17 and 18. Since the light reaching the cell 19 through the filter 21 is only the red component, while the light on cell 20 is unfiltered, the current response from cell 20 is much the stronger, forcing the meter hand 27 far to the right of the zero point.

The neutral filter 22 is then installed in front of the cell 20 to cut down the quantity of light reaching the latter, the degree of density being selected so as to cause the cell's response to come into balance with that of the cell 19, causing the hand 27 to rest on the zero point, Figure 5. It will be evident that if the absolute current output of the cell 19 per unit of light is greater than that of cell 20, as previously set forth, a smaller degree of density is required in the filter 22 to bring the outputs into balance. The balance having been achieved, the neutral density filter 22 is permanently secured in place.

To calibrate the intensity scale 32, the device is exposed to a light of known intensity and the push-button switch 41 is opened, breaking the circuit of the cell 19. This causes the meter to respond to the current from the cell 20 alone, the deflection of the hand consequently representing a measure of the intensity of the light reaching this cell. Since the neutral filter 22 is of fixed density, its reducing effect is in the same proportion at all intensities, so that the scale 32 may be calibrated directly in terms of the intensity of the unfiltered light reaching the window 18. Accordingly, the point first indicated by the hand is marked with the known intensity of the light reaching the window 18, preferably in foot-candies, after which the device is exposed to light of other known intensities and the scale marked correspondingly throughout the desired range. In order to permit accurate reading in the lower intensity region while providing a sufficiently large total range on the dial, the meter 26 may be of the well-known pole-compensating type in which the proportional amplitude of hand movement decreases as the current increases.

When it is desired to convert light of unknown temperature to the standard of 6000° K., in order to photograph a subject on the previously mentioned type of film used herein as an example, the instrument is exposed to the unknown temperature light by sighting it on the source, or if this is not practical, on a white card or other suitable reflector exposed to the light therefrom. If the light temperature is less than 6000° K., the current from the cell 19 predominates, causing the hand 27 to swing to the left of zero into the red field 31, indicating too high a red percentage in the light. Similarly, if the temperature is higher than 6000° K., that is, if the light is deficient in red, the predominance of current from the cell 20 causes the hand 27 to move to the right of zero, indicating too high temperature. The operator then places in the holder slides 23 and 24 a compensating filter 25 which overlies both filters 21 and 22 as illustrated in Figure 6. To raise the temperature, a blue or blue-green filter may be used, while for lowering the temperature a reddish filter is required. The compensating filter 25 which causes the meter hand 27 to move back to stand at zero is thus determined as the proper filter for converting the available light to the temperature corresponding to that of the film standard.

The proper filter 25 having been selected as described, measurement of the intensity of the filtered light for arriving at the proper exposure may be made as follows:

The instrument with the compensating filter 25 still in place, is moved closely adjacent the camera and sighted on the subject to be photographed, the image of the latter being centered on the screen 33. The switch 41 is opened, breaking the circuit of the cell 19 and causing the meter to respond only to the current generated in the cell 20 by light reflected from the subject through the compensating filter 25 and neutral density filter 22. The position of the hand 27 thus indicates the intensity of the compensated light to be received by the camera, permitting the proper exposure to be determined in the usual manner. The filter 25 or a duplicate thereof may then be installed on the camera and the exposure made.

From the foregoing description it is believed evident that the device provides simply and quickly operable means to ensure proper conditions of light and exposure for the standard to which it is balanced. While the temperature of 6000° K. has been used as an example, it is obvious that the instrument may be balanced in a similar manner for any other desired temperature standard. Also, while the temperature balance or un-balance is normally achieved between the full light and red filtered light, in some cases it may be desired to use the blue component instead of the red. For this purpose the filter 21 is made of suitable blue material, and the instrument balanced and calibrated with a neutral density filter 22 in the same manner as previously described.

The operation is also the same, except that when a blue filter 21 is used, movement of the hand 27 to the left of zero indicates too high temperature, and too low temperature is indicated by a swing to the right of zero, these movements being the reverse of those as noted when using a red filter.

As the type of instrument described is balanced at the particular color temperature of the standard with which it is to be used, and the conversion of light of unknown temperature is made by selecting a filter which re-achieves the balance, determination of the absolute temperature of the converted light is not normally required. Therefore calibration of this type of instrument for a temperature range is unnecessary for its operation as described.

Also, since the linear responses of the matched cells to changes in light intensity remain in the same proportion, as previously set forth, the selection of the proper compensating filter to re-achieve balance is independent of the light intensity itself.

Figures 7 to 11 disclose an embodiment of the invention in which readings of absolute temperature values and intensities may be made, simultaneously if desired, and without the use of current switching means.

Referring to Figures 7 and 8, the casing 43 carries a front plate 44 having windows 45 and 46 similar to those of Figures 1 and 2. The photocell 20 and its neutral density filter 22 are arranged behind the window 46 as set forth previously.

Similarly the photocell 19 and its filter 21, the latter being preferably red as previously noted, are disposed behind the window 45, and the slide holder 47 is arranged to receive the compensating filter 25 in such a manner that the latter may overlie both windows 45 and 46.

Two meters 48 and 49 are secured in the back of the casing 43, their dials 50 and 51 being visible through openings 52 and 53. The dial 50 of the meter 48 carries a scale 54 calibrated in color temperature as shown in enlarged detail in Figure 11, the meter having a hand 55 cooperative with the dial.

Similarly, the dial 51 of the meter 49 has a scale 56 calibrated in light intensity, a typical detail of such a dial being shown in Figure 10. Meter 49 also has a hand 57 adapted to indicate intensity values on the scale 56.

A finder screen 58 is secured in the back of the casing 43 between openings 52 and 53 and is optically aligned with a lens 59 disposed behind an opening 60 in the front plate 44. If desired, a pin hole such as that disclosed at 34 in Figure 2, may be substituted for the lens 59 and conversely, a lens may be substituted for the pin hole in the form of the device shown in Figure 2.

Referring to Figure 9, one lead 61 of the meter 48 is connected to the positive side of the photocell 19, while one lead 62 of the meter 49 is similarly connected to the positive side of the photocell 20.

The negative sides of the photocells 19 and 20 are connected to their respective meters 48 and 49 via common conductors 63 and 64. It will be seen from the above arrangement that when the cells are energized, the meter 48 is only responsive to the current furnished by cell 19, while the meter 49 responds only to the current of cell 20.

This form of the device may be calibrated as follows:

The neutral filter 22 placed in front of the cell 20 is selected of such density that a light of the known maximum intensity for which the device is intended will cause the hand 57 to move substantially full scale, at which point the known maximum intensity figure is marked on the dial. Thereafter, the device may be exposed to successive known intensities of light throughout the field of the hand's movement and the corresponding figures are placed on the dial.

The dial 54 of the meter 48 is next calibrated in terms of light temperature by a similar procedure. Both dials having been calibrated for their individual registrations, a correlating calibration is set up between them in the following manner:

The device is sighted on a light source having a convenient known temperature such as 2800° K., by means of the finder screen 58 and lens 59, and the device is then moved towards the light source until the hand 55 indicates the chosen temperature of 2800° K. on the scale 54. Under these conditions, the point at which the hand 57 stands on the light intensity scale 56 is marked with a line 65.

In order to convert light of unknown temperature to any chosen temperature, the device is sighted on the source of unknown temperature light and moved toward or from the source until the hand 57 rests on the line 65, thereby indicating that the correlating quantity of light is being received both through window 45 and window 46.

The temperature of the light is thereupon read directly by the position of the hand 55 on the scale 54. A proper compensating filter 25 is then installed in the slide holder 47 to bring the temperature reading to that desired.

The proper compensating filter 25 for the chosen operating standard having thus been determined, the chosen filter or a duplicate thereof may be installed on the camera or other optical device for which it is desired to convert the light.

Before removing the filter 25 from the metering instrument, the latter may be moved closely adjacent the camera or other operating instrument, sighted on the subject, and the intensity of the converted light at that point read on the meter 49.

Obviously if for any reason it is desired to read the intensity of the unconverted light, this may be done by reading the meter 49 without the filter 25.

The neutral density filter 22, in addition to reducing the current from the cell 20 to an amount within the normal capacity of the meter 49 in the desired range, also protects the cell itself from strong light, thereby reducing the danger of cell fatigue.

From the above description, it will be evident that this type of measuring instrument is adapted to general use with a wide range of light temperature conversion, requiring no differences in the initial calibration for use with different temperature balance standards within its range.

It will also be evident that in both described embodiments the measurement of the intensity of the light, either before or after conversion, is set up by the response of the single photocell underlying the neutral density filter, multiple connection of the two cells by reversing switches being thus eliminated.

The complete calibration of the temperature scale 54 also permits the use of a set of filters 25 which may be graded to effect given temperature changes and marked accordingly for future use, as illustrated in Figure 11a. Thus one filter 25 may be tested and labelled as effective to convert light of temperature 5500° K. to 5000° K., a second from 5000° K. to 4700° K., and so on throughout the series. Thereafter, when the desired temperature change is determined by observation of the hand 55 on the scale 54, the proper compensating filter 25 may be chosen at once from the labelled set.

Figures 12, 13 and 14 illustrate a color camera directly incorporating the features of the present invention. An upward extension 66 of the camera body 67 has in the front thereof a pair of windows 68 and 69 similar to those shown in Figure 1, except that they are arranged side by side. A red filter 70 and a neutral density filter 71 are secured behind the windows 68 and 69, photocells 72 being mounted behind the filters in the manner previously described. The faces of the cells 72 are disposed in the same plane as the film 73, as shown in Figure 13. Two identical slide holders 74 and 75, adapted to hold compensating filters 25, are provided in front of the windows 68, 69, and the camera lens 76 respectively.

A screen 77 in the back of the body extension 66 and a lens 78 in the front thereof form a finder or sighting means both for the light-converting means and the photographing means. The optical axis of the screen 77 and lens 78 is parallel to the optical axis of the main camera lens 76 and is equidistant from the latter and from the centers of the windows 68 and 69. This arrangement assures, first, that equal amounts of light reach the windows 68 and 69 for proper determination of the necessary color compensation, and secondly, that when the camera is sighted on the subject, an intensity reading made of the filtered light from the subject furnishes a highly accurate measure of the light conditions to be applied to the film and thereby makes possible extreme precision in determining the exposure. Another factor contributing to the above precision is the fact, as previously noted, that the faces of the photocells 72 lie in the same plane as the film 73.

For illustration the instrument is shown in Figures 12, 13 and 14 as having a single meter 26 and a push-button switch 41 of the types shown in Figures 1 to 4, the wiring being the same as that shown in Figure 6. Obviously, however, the two-meter arrangement of the type explained in connection with Figures 7 to 11 may be used. In either case the operation is essentially the same as that already explained for the respective separate embodiments.

While the invention has been described in preferred form, it is not limited to the exact structures illustrated, as various changes and modifications may be made without departing from the scope of the appended claims.

What is claimed is:

1. That method of determining the compensating filtration necessary to convert multi-colored light of unknown temperature to multi-colored light of a pre-determined temperature which includes the steps of producing a visual indication of photo-electric responses to a quantity of said known temperature light and to the red component of a second equal quantity thereof, applying neutral density filtration to said first quantity to reduce the same whereby said responses may be equalized, producing a visual indication of photo-electric responses to the red component of an amount of said unknown temperature light and to an equal amount of said unknown temperature light reduced through said neutral density filtration, applying identical color compensating filtration to both said last-named amounts of light until said last-named photo-electric responses are equalized, said last-named equalizing filtration comprising said necessary compensating filtration.

2. In a device of the class described, in combination, a casing, an indicating instrument in said casing having a scale and pointer, a pair of photocells supported in said casing so that their light-sensitive elements may be exposed to light entering through openings in the wall of said casing, a filter overlying the sensitive face of one of said cells, said filter being adapted to pass a preselected color component of said light, a neutral density filter overlying the sensitive face of said other cell, means within said casing electrically connecting said cells to said instrument in current bucking relationship, whereby said instrument may be normally responsive to the difference in current responses of said cells, and a color compensating filter removably supported in over-lying relationship to both said first and second filters.

3. A device as claimed in claim 2 including means to open the circuit of one of said cells, whereby said instrument may be rendered responsive solely to the current of said other cell.

4. A device as claimed in claim 2 including means to open the circuit of said first cell, whereby said instrument may be responsive solely to the current of said second cell.

5. A device as claimed in claim 2 including sighting means in said casing, said means having its optical axis perpendicular to the plane of said openings and equidistant from the centers of said openings, whereby a light-source sighted by said means may cast equal quantities of light to said openings.

6. In a device of the character described, in combination, a pair of photocells, means to apply a quantity of multicolored light to one of said cells to set up an electric response, means to apply a component of a second quantity of said light to said second cell whereby a second electric response may be set up, said second light quantity being in pre-determined ratio to said first quantity, a meter electrically connected to both said cells to indicate the difference of said electric responses, and means to apply a color compensating filter to both said light quantities whereby said electric responses may be equalized.

7. In a photometric device, in combination, a casing having spaced light admitting apertures in one wall thereof, a pair of spaced photocells in said casing, each operatively positioned to receive light admitted through a respective aperture, a filter capable of transmitting a preselected quantity of all wavelengths of light operatively positioned before one of said photocells, a second filter capable of transmitting only a preselected narrow band of wavelengths of light operatively positioned before the other of said photocells, a meter electrically connected to said photocells in current bucking relation, a movable pointer and a scale associated with said meter for indicating differentials in current responses of said cells to light transmitted through said filters for selecting a first filter capable of balancing said current responses, and means for removably supporting a color compensating filter in blanket relationship to said first and second filters.

8. A device of the character described in claim 7, wherein selectively operable means are provided for measuring the intensity of light received by the photocell receiving all wavelengths of light.

VIRGIL O. GITTUS.

REFERENCES CITED

The following references are of record in the file of this patent:

UNITED STATES PATENTS

| Number | Name | Date |
| --- | --- | --- |
| 2,298,667 | Weymouth | Oct. 13, 1942 |
| 2,302,554 | Kingsbury | Nov. 17, 1942 |
| 2,444,674 | Rath | July 6, 1948 |
| 2,455,116 | Gittus | Nov. 30, 1948 |
| 2,472,381 | McMaster | June 7, 1949 |

FOREIGN PATENTS

| Number | Country | Date |
| --- | --- | --- |
| 446,016 | Great Britain | Apr. 22, 1936 |
| 357,983 | Italy | Apr. 2, 1938 |
| 508,802 | Great Britain | July 5, 1939 |